Patented Mar. 20, 1928.

1,663,159

UNITED STATES PATENT OFFICE.

KARL EBERS, OF AHRENSBURG, GERMANY.

PROCESS FOR PURIFYING AND BLEACHING HEAVY SPAR.

No Drawing. Application filed December 22, 1925, Serial No. 77,132, and in Germany December 24, 1924.

This invention relates to a process of bleaching of heavy spar. Proposals have been made to draw from the heavy spar the foreign coloring matter consisting mainly of iron compounds by boiling it with acids, as, for instance, with sulphuric acid. The results attained by the method are not satisfactory probably owing to the fact that the iron oxides (which are the principal impurities in the spar), dissolve only with great difficulty and incompletely in acids.

I have discovered that good bleaching results are obtained by treatment with chlorine, especially with nascent chlorine, because the iron oxides are quickly and easily dissolved by such treatment. Any process giving a watery solution of free chlorine may be applied. It is for instance especially economical to work with manganese dioxide and hydrochloric acid.

The ground spar which may be roasted first, well mixed with a low percentage of ground manganese dioxide is added to concentrated hydrochloric acid and the mixture is heated up to a comparatively low temperature.

The excess of escaping chlorine is passed over lime or is caught in caustic soda solution.

The hydrochloric acid used is finally drawn off and may be frequently used again for new processes.

*Example.*

100 kilogrammes of roasted and ground heavy spar are well mixed with 2 to 3 per cent of manganese dioxide. This mixture is then brought into about 50 kilogrammes of concentrated commercial hydrochloric acid and the mixture is then heated by steam until completely decolorized.

The mixture is then allowed to settle, the acid drawn off from the spar, the latter is washed by means of water until neutral reaction and is then dried.

I claim:—

1. Process of purifying and bleaching heavy spar consisting in well mixing the ground spar with about 2 to 3% of manganese dioxide, treating the mass with strong hydrochloric acid, heating sufficiently to cause reaction and thereafter washing.

2. Process of purifying and bleaching heavy spar consisting in mixing the ground spar with manganese dioxide and heating this mixture with hydrochloric acid and washing.

3. Process of purifying and bleaching heavy spar consisting in roasting and grinding the spar, mixing with manganese dioxide and heating the mixture with hydrochloric acid and washing.

In testimony whereof I affix my signature.

KARL EBERS.